Oct. 6, 1970   G. W. SPRING, JR   3,531,855

MATERIAL HANDLING PALLETS

Filed July 7, 1967

INVENTOR
GEORGE W. SPRING, JR.

BY
Cushman, Darby & Cushman
ATTORNEYS

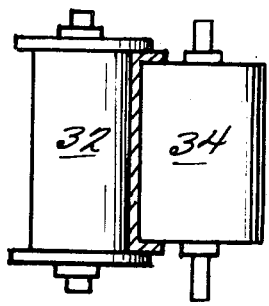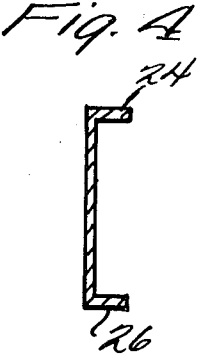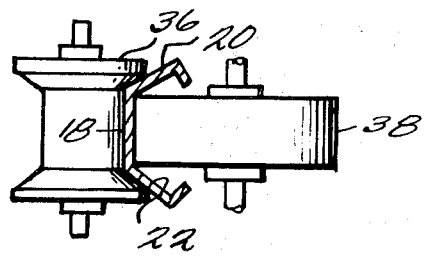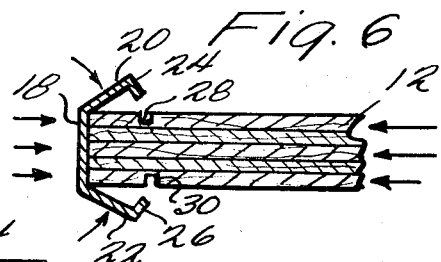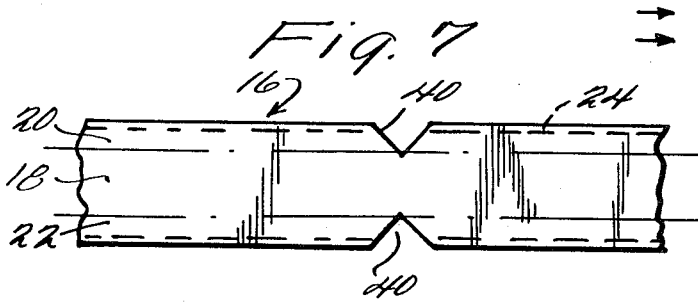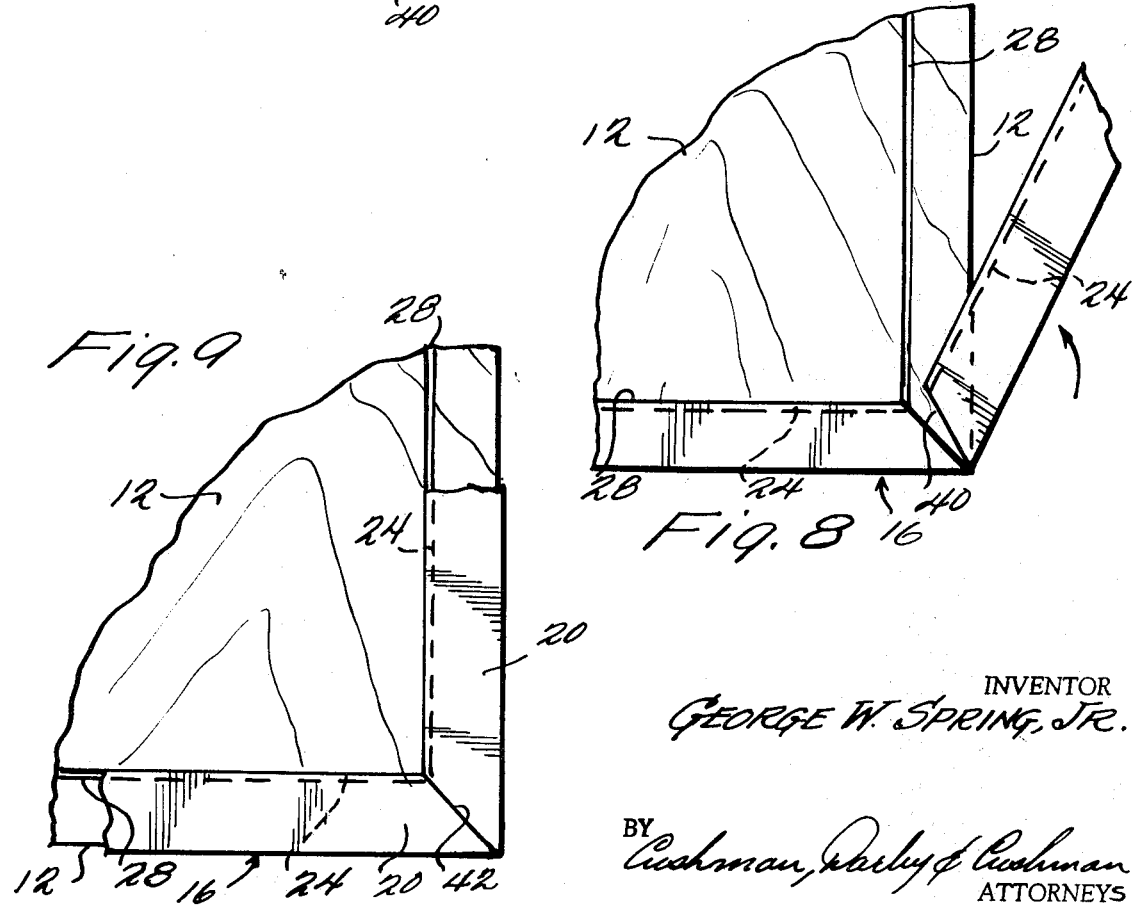

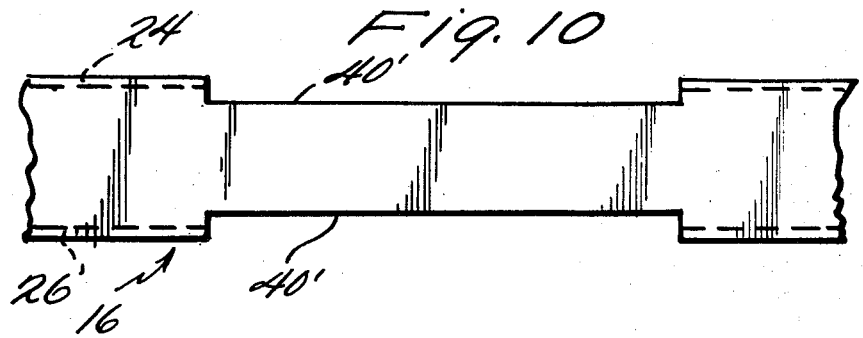
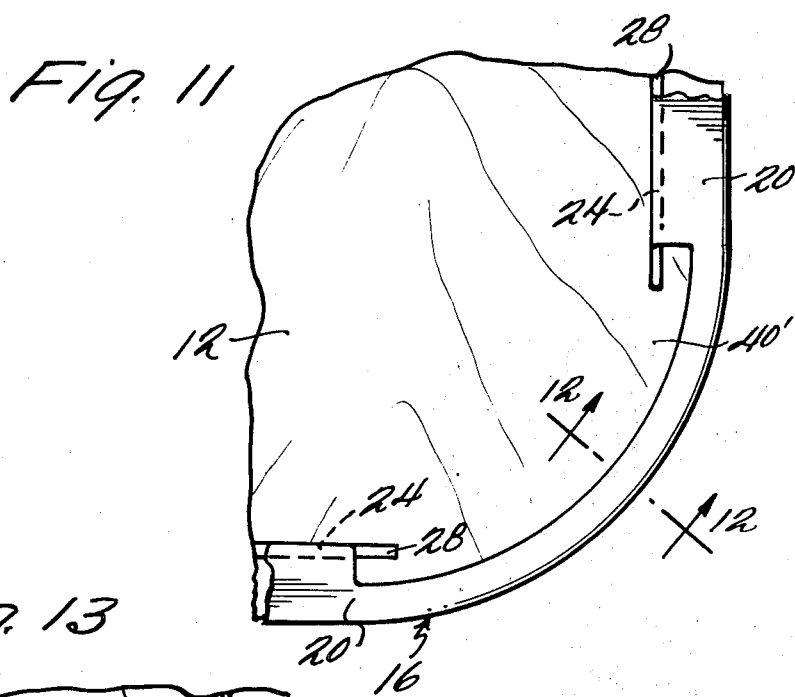
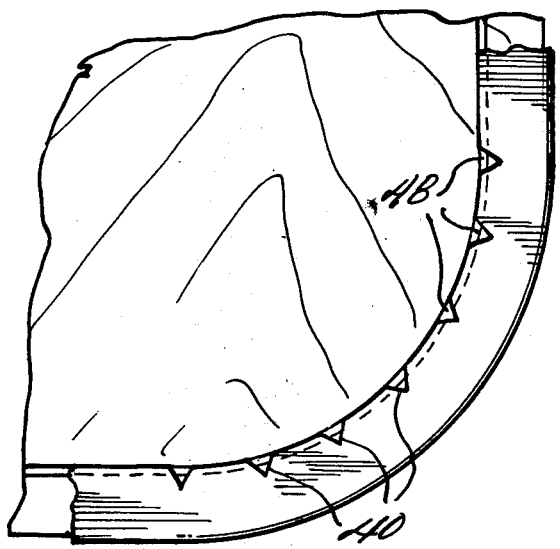
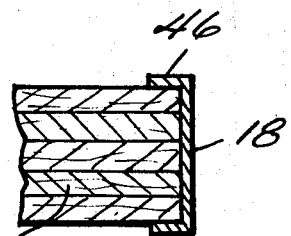

United States Patent Office 3,531,855
Patented Oct. 6, 1970

3,531,855
MATERIAL HANDLING PALLETS
George W. Spring, Jr., Michaux, Va.
(Rte. 1, Powhatan, Va. 23139)
Continuation-in-part of application Ser. No. 302,767,
Aug. 13, 1967. This application July 7, 1967, Ser. No.
651,914
Int. Cl. B21d 39/00; B23p 11/00
U.S. Cl. 29—509                                              6 Claims

ABSTRACT OF THE DISCLOSURE

A load-supporting pallet comprising a plywood deck having a continuous metal strip clamped to its outer edges to protect the latter from splitting and abrasion. The edges of the strip are embedded in pre-cut grooves in the upper and lower edges of the deck so as not to be dislodged by the sliding of handling devices or loads along the deck. The method of applying the strip to the deck edges includes the steps of preforming a lip or flange along each edge of a stiff metal strip, longitudinally wrapping the strip about the deck so as to cover the edges and corners thereof and bending the metal to force the flanges into pre-cut kerfs in the upper and lower surfaces of the deck.

DISCLOSURE

This is a continuation-in-part of application Ser. No. 302,767, filed Aug. 13, 1963, now abandoned.

This invention relates to load-supporting structures of the pallet type and in particular to the protection of the edges of a wooden pallet deck, especially a laminated plywood deck, by means of a protective metal edging.

As is well-known, a pallet consists essentially of a rigid load-carrying wooden deck which is square or rectangular in plan view and a plurality of spaced-apart supporting blocks extending downwardly from the lower surface of the deck so as to raise the deck above the surface on which the supports rest. The spacing between the deck and the supporting surface permits load-handling equipment, particularly fork lift blades to be inserted and engaged with the lower surface of the deck. In use, pallets are subjected to severe abrasion and lateral crushing forces due to the movement into engagement with other structures, either intentionally or accidentally, and due to accidental engagement of the tips of fork lift blades with the the edges of the deck. The corners of the deck are particularly subject to damage when the loaded pallet is moved or when an empty pallet falls from the top of a stack of empty pallets. At the present time the decks of many pallets are constructed of laminated plywood, and the problem of edge splitting and consequent deterioration of the deck and possible injury to workmen is intensified due to the separation of the different laminates from each other.

It is the primary object of the present invention to protect the raw wood edges of a pallet deck, particularly a plywood deck with a metal protective strip which clamps over the edges of the deck in a manner to protect them from abrasion and splitting and in a manner which renders the strip highly resistant to dislodgement by sliding fork lift blades or the like, or by impact with another structure.

It is a further object to provide a method of applying the aforesaid metal protective strip which includes the steps of pre-forming a lip or flange along each longitudinal edge of a stiff metal strip and precutting a kerf in the upper and lower surfaces of the deck parallel and close to the deck edge and subsequently bending the metal toward the deck surfaces so as to clinch the lips into the kerfs. The center portion of the metal strip must be forced tightly against the deck edge during the bending operation in order to prevent any tendency for the deck to be squeezed out from between the edge portions of the strip. The method also includes the step of wrapping the strip longitudinally around the corners of the deck so that there are no metal edges which would tend to separate from each other or from the wood if the corner is damaged during subsequent use.

The invention will be further understood from the following detailed description taken with the drawings in which:

FIGS. 3, 4, 5 and 6 are schematic sectional views illustrating the steps of preforming the metal edging and applying it to an edge of a pallet deck;

FIGS. 7, 8 and 9 are plan views illustrating the steps of applying the preformed metal strip to a right angle corner portion of a pallet deck;

FIGS. 10, 11 and 12 are views illustrating the steps of applying the preformed metal strip to a rounded corner portion of a pallet deck; and FIG. 13 is a fragmentary plan view of another construction suitable for a pallet deck having rounded corners.

Figure 1:
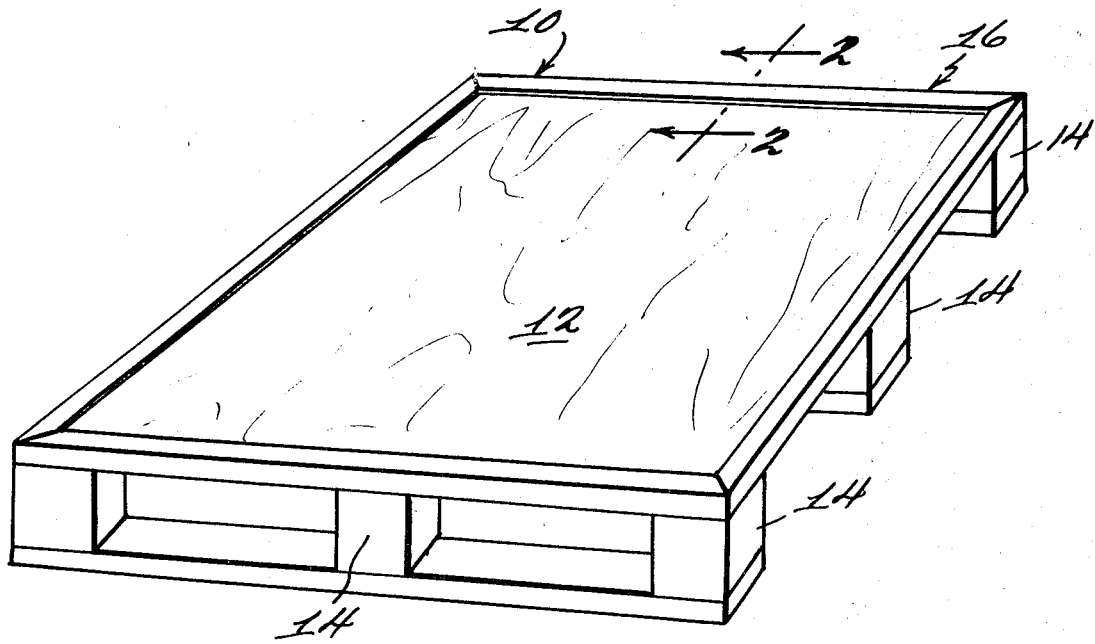
FIG. 1 is a perspective view of a pallet having a plywood deck provided with a metal protective edging in accordance with the principles of the present invention.
Figures 2, 2A, 2B:
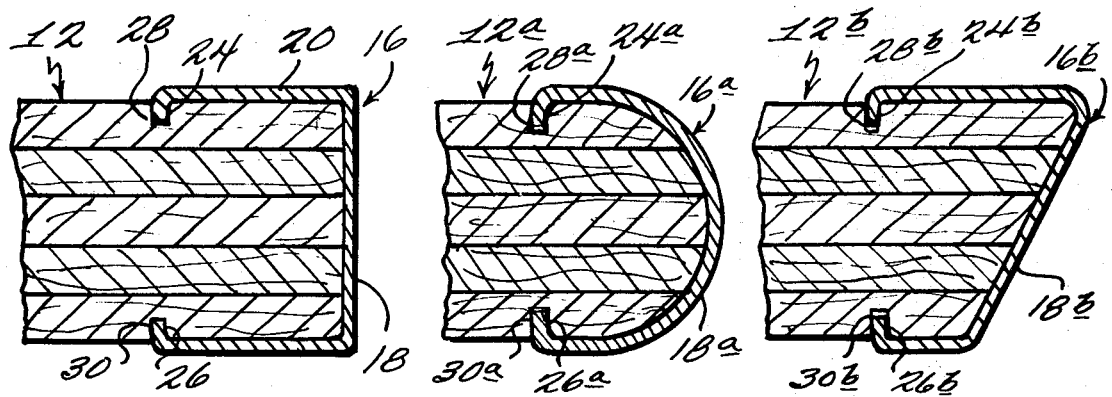
FIG. 2 is a fragmentary sectional view taken on the line 2—2 of FIG. 1.
FIG. 2a and FIG. 2b are fragmentary sectional views similar to FIG. 2 illustrating protective edgings of different shapes.

Referring to FIG. 1 there is shown a pallet 10 having a laminated plywood deck 12 and conventional spaced-apart, block-type supports 14 secured to the lower surface of the deck 12. In accordance with the principles of the present invention each edge of the deck 12 carries a protective metal edging 16. As seen in FIG. 2 the strip 16 has a flat longitudinal center portion 18 lying against the raw laminated wood edge, upper and lower edge portions 20 and 22 which engage the upper and lower surfaces of the deck 12, and hooked lips or flanges 24 and 26 which are embedded in grooves 28 and 30 in the upper and lower deck surfaces.

The edging 16 is preferably continuous around the periphery of the deck 12 including the corners, as shown, although in some cases it may be discontinuous so as to protect local areas subject to abrasion in mechanical palletizing machines. The edging 16 may also be applied to other conventional types of pallets having plywood decks, such as the single or double faced stringer or runner type pallet and the partial four-way entry variety.

The clinching action of the metal protective edging 16 prevents separation of the plywood laminations in the event of adhesive bond failure and prevent splitting of the vulnerable plywood edges by the ends of fork lifts or by abrasive contact with dollies or other handling equipment. The edging 16 will not be dislodged or disturbed by forks sliding along the deck 12 from an opposite side, because the hooked lips or flanges 24 and 26 are embedded in their respective grooves 28 and 30.

FIG. 2a illustrates a modified protective edging 16a which has a curved center portion 18a lying against the edge of a plywood deck 12a. The edges of the edging 16a are hook-shaped at 24a and 26a and are embedded in pre-cut grooves in the upper and lower surfaces in the deck 12a. The curved surface 16a is advantageous in that it tends to deflect a fork or probe entering the lift area of the pallet.

FIG. 2b illustrates a third form of metal protective edging 16b which has a flat but inwardly and downwardly inclined center portion 16b adapted to deflect a fork or probe. As before, the edges of the edging 16b are hook-shaped as at 24b and 26b and are embedded in precut grooves in the upper and lower surfaces of the pallet deck 12b.

A description of the steps by which the protective edging 16 is applied will suffice for the strips 16a and 16b. First, the longitudinal grooves or kerfs 28 and 30 are cut in each of the upper and lower surfaces of the pallet deck 12, the grooves being coextensive with each other and extending parallel to each edge of the deck 12. Then, and referring now to FIGS. 3 and 4, hooked lips or flanges 24 and 26 are preformed along each longitudinal ledge portion of an elongated metal strip 16 which may be, for example, 20 gauge steel. This is most readily accomplished by passing the strip 16 in a longitudinal direction between opposed rollers, such as those illustrated in FIG. 3 at 32 and 34. Several passes between the rollers 32 and 34 may be required in order to avoid rupturing the metal at the bend line.

After the strip 16 has been rolled to the shape shown in FIG. 4, it is further deformed to define the aforementioned center portion 18 and the edge portions 20 and 22. This is accomplished by bending the strip along longitudinal lines which are spaced apart a distance equal to the thickness of the pallet deck 12. As shown in FIG. 5, this may be done by passing the strip 16 between rollers 36 and 38 to effect an angle, for example 45°, between the center portion 18 and the edge portions 20 and 22.

Then, as illustrated in FIG. 6, the center portion 18 of the now-preformed strip 16 is placed and held against the plywood edge of the deck 12, and the edge portions 20 and 22 are bent toward the deck surfaces so as to embed the lips or flanges 24 and 26 in the precut grooves 28 and 30, thereby locking the whole metal edging to the deck and clinching together the plywood laminations. The bending operation may be carried out by pressing or rolling and in either case it is necessary to simultaneously force the strip portion 18 and the deck edge into engagement with each other in order to prevent a tendency for the deck 12 to be squeezed out from between the strip portions 20 and 22. It is highly desirable to prevent any space from forming between the strip portion 18 and the deck edge, because a space would cause misalignment of the lips 24 and 26 with their grooves 28 and 30, and because the strip portion 18 would be subject to buckling by lateral impacts during use.

The metal strip 16 should be continuous, that is, wrapped around the corners of the deck 12 because this avoids abutting ends of the strip 16 at these locations. This is highly desirable, because an impact on the corner of the deck during use will not tend to peel off an end of the strip 16. One embodiment of this feature is illustrated in FIGS. 7, 8 and 9. In order to prevent overlapping or buckling of the edge portions 20 and 22 as the strip 16 is wrapped around a corner, each of these portions is provided with a cutout 40 which in this case is triangular in order that the strip 16 will wrap properly around a right angle. A cutout 40 is, of course, provided at the location of each corner of the deck, and in practice it is easier to cut away the metal before the lip or flanges 24 and 26 are formed. FIG. 8 illustrates an intermediate stage at which one edge of a pallet deck 12 has had a longitudinal portion of the strip 16 clinched thereto, as illustrated in FIG. 6, while another longitudinal portion, still having the shape shown in FIG. 5, is being wrapped around a corner. It will be seen that the grooves 28 in the deck surface have not been cut all the way to the deck corners, although this is immaterial so long as they extend far enough to receive the lips 24 when the strip has been fully wrapped and then clinched, as seen in FIG. 9. In the final article the edges of the cutouts 40 abut each other as seen at 42 in FIGS. 1 and 9. The ends of the strip 16 terminate and abut each other at some point along one deck edge, for example at 44 in FIG. 1.

FIGS. 10 and 11 illustrate how a rounded corner, which is less susceptible to damage by impact, may be formed by less wrapping and clinching technique described above. In this case an elongated rectangular cutout 40' is provided in each of the edge portions 20 and 22 of the strip 16. As shown, the cutouts 40' do not extend the total transverse dimension of the edge portions 20 and 22, so that in the finished article there remains a flap 46 which is pressed or rolled into tight engagement with the respective upper or lower deck surface.

It is possible, if desired, to cut a continuous curved groove 48 in each surface of the deck of FIG. 11 at the location of the corners and to then fit a lipped or flanged edging 16 thereto by providing a plurality of small cutouts 40', as illustrated in FIG. 13.

While a specific embodiment of the invention has been described the details thereof are not intended to be limiting except as they appear in the appended claims.

What is claimed is:

1. In the method of constructing a load-supporting pallet having a wood deck and depending support blocks, the improvement which comprises applying a protective edging to an exposed edge and corner of the deck by the steps of: forming an elongated groove in each of the upper and lower surfaces of the wood deck at a location near the exposed edge of the deck; forming a lip along each edge of an elongated metal strip; placing the longitudinal center portion of the strip into tight engagement with the edge of the deck and bending the edge portions of the metal strip toward the respective upper and lower surfaces of the deck and embedding the lips in the grooves in the deck surfaces while holding the center portion of the strip and the deck edge in engagement thereby protecting the deck edge against splitting and abrasion during use and thereby concealing the edges of the strip so as to prevent sliding obstacles from disturbing the strip and folding the metal strip longitudinally around said corner thereby forming a continuous protective edging having no ends susceptible to separating from each other or from the deck during use.

2. A method as in claim 1 wherein said deck is constructed of laminated plywood.

3. A method as in claim 1 wherein said bending operation is effected by rolling.

4. A method as in claim 1 including the step of cutting away edge portions of the metal strip at the location of the deck corner to thereby avoid undesirable deformations of the metal when the strip is folded around the corner.

5. A method as in claim 1 wherein said deck corner is an exterior corner and including the step of rounding the corner prior to folding the strip around the corner.

6. In the method of constructing a load-supporting pallet having a laminated plywood deck and depending support blocks, said deck exhibiting straight edges and corners, the improvement which comprises applying a protective edging to the exposed edges and the corners of the deck by the steps of: forming an elongated groove in each of the upper and lower surfaces of the wood deck at a location near each exposed edge of the deck; preforming a metal strip to be subsequently applied to the edges and corners of said deck by cutting away edge portions of a metal strip at locations which are longitudinally spaced apart a distance corresponding to the length of a side of said deck, bending each longitudinal edge portion of the metal strip into the form of a lip, and bending the longitudinal center portion of the strip to the contour of the edge of the deck; placing the longitudinal center portion of a first portion of the strip into tight engagement with an edge of the deck; bending the edge portions of the metal strip toward the respective upper and lower surfaces of the deck and embedding the lips in the grooves in the deck surfaces while holding the center portion of the strip and the deck edge in engagement; folding the preformed metal strip longitudinally around said corner so as to place the longitudinal center portion of the second portion of the preformed strip in tight engagement with the adjacent edge of the deck and repeating the bending and embedding steps with respect to said second portion.

References Cited

UNITED STATES PATENTS

| | | | |
|---|---|---|---|
| 1,967,666 | 7/1934 | Fisher | 52—627 |
| 2,254,190 | 8/1941 | Ricken | 52—627 |
| 2,743,980 | 5/1956 | Hobbs | 52—627 XR |
| 3,028,638 | 4/1962 | Goellner | 52—627 |
| 3,251,322 | 5/1966 | Downs et al. | 108—58 |
| 3,294,353 | 12/1966 | Rowe | 52—627 |
| 3,363,390 | 12/1968 | Crane et al. | 52—627 XR |
| 514,233 | 2/1894 | Kubach | 52—623 |
| 1,035,924 | 8/1912 | Tyden | 52—623 |
| 2,278,331 | 3/1942 | Meyercord. | |
| 2,295,647 | 9/1942 | Geimer | 52—624 XR |
| 2,402,717 | 6/1946 | Winer | 52—623 XR |
| 2,832,130 | 4/1958 | Harvey | 285—338 |
| 2,862,254 | 12/1958 | Meek | 52—623 XR |
| 3,326,006 | 6/1967 | Mount | 285—382 XR |
| 1,035,924 | 8/1912 | Tyden | 52—623 |
| 2,817,485 | 12/1957 | White | 108—57 |

FOREIGN PATENTS

| | | |
|---|---|---|
| 59,953 | 9/1954 | France. |
| 59,953 | 1/1950 | France. |
| 1,132,384 | 1/1956 | France. |

BOBBY R. GAY, Primary Examiner

G. O. FINCH, Assistant Examiner

U.S. Cl. X.R.

108—51